(12) United States Patent
Perrett et al.

(10) Patent No.: US 11,599,944 B2
(45) Date of Patent: Mar. 7, 2023

(54) SYSTEMS AND METHODS FOR PROVIDING REAL-TIME PRE-TRADE RISK ASSESSMENT

(71) Applicant: Fixnetix Limited, Aldershot (GB)

(72) Inventors: Marcus Perrett, London (GB); Paul Ellis, Great Hinton (GB); Hugh Hughes, London (GB)

(73) Assignee: FIXNETIX LIMITED, London (GB)

( * ) Notice: Subject to any disclaimer, the term of this patent is extended or adjusted under 35 U.S.C. 154(b) by 0 days.

(21) Appl. No.: 17/473,585

(22) Filed: Sep. 13, 2021

(65) Prior Publication Data

US 2022/0076336 A1 Mar. 10, 2022

Related U.S. Application Data

(63) Continuation of application No. 16/588,669, filed on Sep. 30, 2019, now abandoned, which is a continuation of application No. 15/183,499, filed on Jun. 15, 2016, now abandoned.

(60) Provisional application No. 62/181,019, filed on Jun. 17, 2015.

(51) Int. Cl.
*G06Q 40/04* (2012.01)
(52) U.S. Cl.
CPC .................... *G06Q 40/04* (2013.01)
(58) Field of Classification Search
CPC .................................................. G06Q 40/04

USPC ............................................................ 705/37
See application file for complete search history.

(56) References Cited

U.S. PATENT DOCUMENTS

| | | | | |
|---|---|---|---|---|
| 2012/0130884 A1* | 5/2012 | Ellis | .................. | G06Q 40/08 705/37 |
| 2012/0130919 A1* | 5/2012 | Gaber | .................. | G06Q 40/04 705/36 R |
| 2013/0226764 A1* | 8/2013 | Battyani | .................. | G06Q 40/04 705/37 |
| 2013/0282549 A1* | 10/2013 | Howorka | .................. | G06Q 40/04 705/37 |
| 2014/0223091 A1* | 8/2014 | Hughes | .................. | G06F 16/2255 711/105 |
| 2017/0301025 A1* | 10/2017 | West | .................. | G06Q 40/06 |

* cited by examiner

*Primary Examiner* — Robert R Niquette

(57) ABSTRACT

Systems and methods are disclosed that provide real-time pre-trade risk assessments for multiple parties. In one embodiment, a Programmable Logic Device (PLD) may be embedded within an Automated Trading Systems (ATS) architecture by utilizing the Intel socket G or the PCIe interface to provide pre-trade risk functionality. The system may also provide a method for interacting with the ATS DRAM or L1 cache to provide faster access to orders in ATS memory for PLDs. The system may use the Quick Path Interconnect between an embedded processor and a PLD to transfer memory maps. The system may also add additional libraries to an ATS processor to accelerate the transfer or memory maps to a PLD. The system also may use system interrupts to cancel erroneous orders within an ATS processor from a PLD housed within the same physical architecture.

20 Claims, 6 Drawing Sheets

SYSTEMS AND METHODS FOR PROVIDING REAL-TIME PRE-TRADE RISK ASSESSMENT

CROSS-REFERENCE TO RELATED APPLICATIONS

This application is a continuation of U.S. patent application Ser. No. 15/183,499, filed on Jun. 15, 2016, and entitled "Systems and Methods for Providing Real-time Pre-Trade Risk Assessment", which claims priority to U.S. Provisional Application No. 62/181,019, filed on Jun. 17, 2015 and entitled "Embedded Hardware Based System Which Provides Real-Time Pre-Trade Risk Assessments for Multiple Parties and Method Thereof", all of which are incorporated in their entireties herein by reference.

FIELD OF THE INVENTION

The present disclosure relates to systems and methods for assessing trade risk in real-time.

BACKGROUND

Various systems are commercially available to financial market participants and their clients that provide some combination of pre- and post-trade risk assessments, real-time market data and also trading connectivity to numerous liquidity venues. Liquidity venues can list financial instruments such as, for example, securities, options, futures, commodities and foreign exchange. The aim of such systems is generally to provide financial market trading participants with the fastest available electronic market data and trading connectivity to liquidity venues, while also providing intra-day trading risk assessments for both the participant and also their own electronically connected trading clients.

SUMMARY

Various embodiments of the present disclosure can include systems comprising a first memory, a shadow map of the first memory, an automated trading system (ATS) processor in communication with the first memory and the shadow map, and a trade risk processor in communication with the ATS processor. The ATS processor can be configured to receive market data information, write market order information to the first memory based on the market data information, update the shadow map based on the market order information written to the first memory, and prepare a market order for transmission to a market venue based on the market order information. The trade risk processor can be configured to obtain the market order information from the shadow map, and perform a trade risk assessment based on the market order information obtained from the shadow map, wherein performance of the trade risk assessment and preparation of the market order are simultaneous.

In an embodiment, the trade risk processor is in communication with the ATS processor via a PCIe connection.

In an embodiment, the first memory comprises a dynamic random access memory.

In an embodiment, the ATS processor is further configured to write the market order information to a predictable location on the dynamic random access memory.

In an embodiment, the trade risk processor is in communication with the ATS processor via an Intel Socket G connection.

In an embodiment, the first memory comprises a cache memory.

In an embodiment, the ATS processor is further configured to write the market order information to a predictable location on the cache memory.

In an embodiment, the ATS processor is further configured to copy the market order information from the cache memory to the shadow map via a Quick Path Interconnect.

In an embodiment, the trade risk processor is further configured to determine whether the market order information satisfies one or more risk criteria, and if it is determined that the market order information does not satisfy the risk criteria, transmit a cancel order command to the ATS processor.

In an embodiment, the cancel order command is transmitted to the ATS processor before the ATS processor completes preparing the market order for transmission to a market venue.

In an embodiment, the cancel order command is transmitted via a system interrupt.

In an embodiment, the system interrupt is transmitted to the ATS processor via a Northbridge associated with the ATS processor.

Various embodiments of the present disclosure can include a method comprising receiving market data information. Market order information is stored in a first memory based on the market data information. A market order is prepared for transmission to a market venue based on the market order information. A shadow map is updated based on the storing the market order information in the first memory. A trade risk assessment is performed based on the updated shadow map, wherein performance of the trade risk assessment and preparation of the market order are simultaneous.

It should be appreciated that many other features, applications, embodiments, and/or variations of the disclosed technology will be apparent from the accompanying drawings and from the following detailed description. Additional and/or alternative implementations of the structures, systems, and methods described herein can be employed without departing from the principles of the disclosed technology.

Figure 1A:
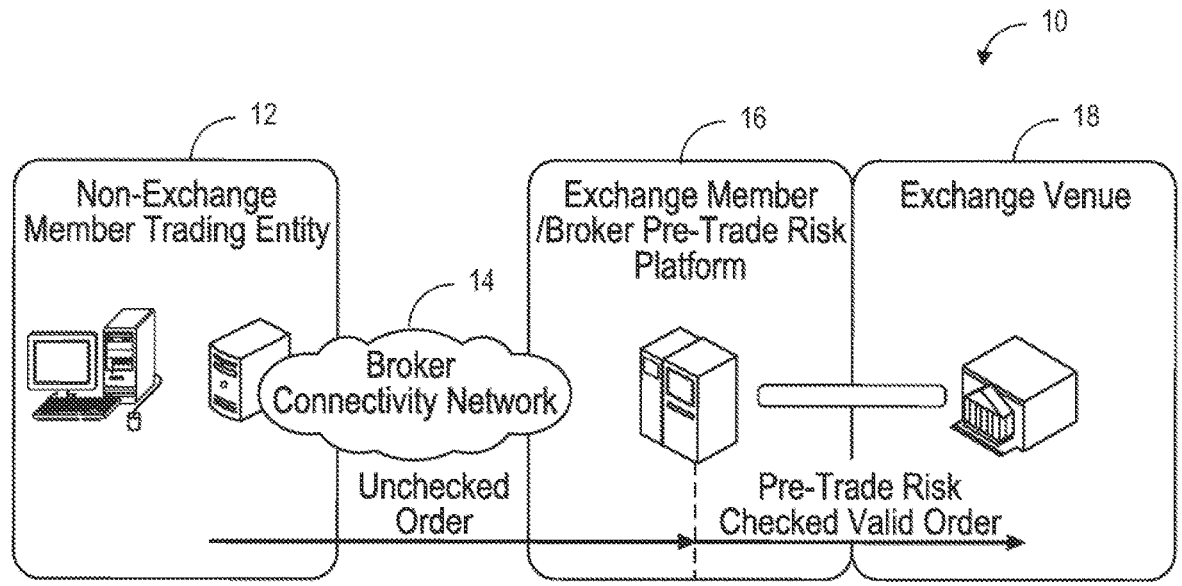
FIGS. 1A and 1B illustrate example scenarios associated with software-based or full function embedded hardware-based risk assessment for a market order from an automated trading system.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Real-Time Pre-Trade Risk Assessment

In 2010, US regulators attempted to put controls in place governing the practice of "naked access," which is the ability for non-exchange member firms to trade on a stock exchange using a member broker's ID but without the use of any pre-trade risk checks. The aim of the regulators was to increase visibility. Regulators sought to improve the identification of trading activities by various participants. Regulators also sought to ensure that non-member firms trading via a member broker could not spend more than their allowed trading limit and that the member and non-trading member firms alike could not enter erroneous orders into a market that could subsequently cause wide scale disruption and also potentially put the firm entering the order at financial risk.

Accordingly, legislation commonly known as Dodd-Frank, along with SEC directive 15c3, were both published and released with the aim of compelling brokers to instigate controls between their clients' order flows and the exchange. Such broker/clients often utilized trading strategies via automated trading systems ("ATS") that relied on the lowest latency pathways possible. As such, any pre-trade risk system that was to be installed between them and the exchange was required to be a fast as possible. Latency is seen as vital to participants because it has a direct effect upon the success or failure of their trading strategy. In terms of a pre-trade risk application, latency on current systems is generally measured in milliseconds (ms), microseconds (us) or nanoseconds (ns). Regardless of the measurement type used, latency in a pre-trade risk system can generally be defined as the time taken to complete all of the following tasks:

1. read orders emanating from an order generating source;
2. check the validity of the orders from a perspective of potential risk exposure; and
3. depending on the validity check, either allow the orders to pass back to the transit route to the market venue, or generate an order cancellation message back to the order generating source.

As a consequence of the various directives and legislation, three prevalent methods for providing pre-trade risk checks in financial markets have become visible since 2010: (1) software-based risk applications, (2) full function embedded hardware (FFEH)-based risk applications, and (3) packet sniffer-based risk applications.

1. Software-Based Risk Applications

Software-based risk applications are the most common type of pre-trade risk platform in use today and, due to the ease of writing software code, they offer a wide range of pre-trade risk calculations. Software-based pre-trade risk applications are able to prevent erroneous orders from hitting a market venue whilst also allowing operators to keep a record of the state of other current orders within a market (e.g., a real-time view of current market exposure per client/per venue). In terms of meeting the regulatory requirements, these software-based risk applications are able to meet all the standards as currently listed.

However, despite their flexibility and ease of adaption, software-based solutions have one significant drawback which concerns their handling of machine generated orders. Essentially, they are perceived as very slow in the amount of time it takes them to provide the pre-trade risk checks. This is problematic, as this time delay can often result in machine generated orders missing their chance of execution on a chosen venue. Software-based systems are perceived as slow due mainly to the general purpose nature of the current hardware upon which they operate but also because of the sequential nature of the software code itself.

A major issue with current hardware that is utilized to implement software-based risk applications is that each internal computer component, including the operating system, takes a specific amount of time latency to communicate with other internal and external components via the kernel. The communication between computer components is naturally essential to the operation of current combined market data, trading and risk applications. However, whether the delay occurs in reading a market data stream, analyzing current risk or in sending orders to a liquidity venue, the impact is that the overall combined latency of all the functions is increased while each component related to each business function seeks to communicate with other components within the computer system via an internal bus. This problem has also been exacerbated by current transmission protocols, such as TCP/IP and UDP, which add additional latency to current commercially available systems. Software-based risk solutions typically operate with risk latencies between 50 us and 5 ms at very best depending upon the application.

2. Full Function Embedded Hardware-Based Pre-Trade Risk Applications

Full function embedded hardware (FFEH)-based solutions have become available in financial markets as a direct response to the U.S. market regulations since 2010. The aim of full function embedded hardware-based pre-trade risk systems is to take the same full range of pre-trade/intra-day risk functionality available in current software-based systems, and to embed it upon a hardware device in order to reduce the latency of providing the various pre-trade risk calculations. FFEH-based solutions allow for the prevention of erroneous orders being sent to a market but also keep a current record of the open orders on a venue. This means that, like software-based applications, FFEH-based solutions can calculate all the various intra-day risk limits per client (as directed by regulatory authorities). FFEH-based systems can be designed on a wide range of hardware. However, current hardware designs and ease of supply have resulted in most FFEH-based pre-trade risk systems utilizing hardware cards known as Frame Programmable Gate Arrays (FPGA). FPGAs allow an operator to write pre-trade risk calculations directly onto a microchip on the FPGA in a machine code known as VHDL (VHSIC (Very High Speed Integrated Circuits) Hardware Description Language). VHDL is a standard hardware description language specifically designed to describe the behavior of a physical circuit or microchip. Unlike many traditional languages that operate sequentially, VHDL code operates concurrently, which allows for vastly reduced operational latency as the code is able to perform more functions simultaneously. Therefore, a full function embedded FPGA-based pre-trade risk system reduces operational latency by writing the functional data, trading and risk application directly onto the FPGA microchip as opposed to software-based applications which are installed on a hard-drive which is then uploaded into memory. Overall, the FFEH-based design approach has resulted in full pre-trade risk latency calculations being reduced to 1-2 us in hardware-based systems depending upon the specific application.

However, FFEH-based systems are not without their own drawbacks. Despite the fact that an FFEH-based system will provide all the pre-trade risk calculations as demanded by the legislators with far superior latency figures compared to a software-based system, the key weakness of an FFEH-based system is the cost and time to develop an FFEH-based system for each venue, given that the whole application needs to be written in VHDL language. Moreover, because, on average, each market venue might have two software interface upgrades of its own per annum, FFEH-based systems are also expensive to maintain as they often need to be updated at least every 6 months per market venue. Another drawback of existing FFEH-based systems is that they are not as fast as other pre-trade risk systems such as packet sniffers (PS) when preventing erroneous orders being sent to an exchange for execution.

3. Packet Sniffer Pre-Trade Risk Applications

Packet sniffers, as they are commonly known, have also arisen as a result of the new market regulations of circa 2010. From a hardware perspective, packet sniffers generally operate similar architecture to FFEH-based risk systems, in that they generally utilize FPGA technology to provide their pre-trade risk calculations.

Like FFEH-based and software-based risk systems, packet sniffers also seek to interrogate an order message before it reaches an electronic market. However, their functionality, method for pre-checking any orders, its system of preventing any erroneous orders being sent to a venue are markedly inferior compared to FFEH-based and software-based systems.

Figure 1B:
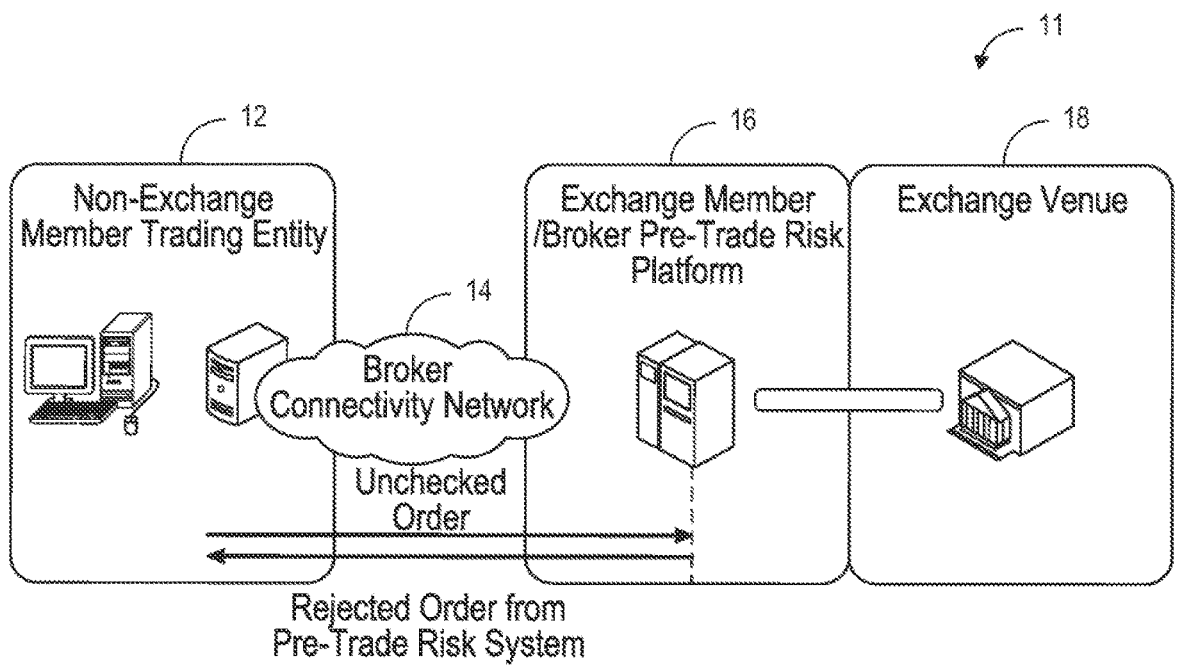

Current software-based and FFEH-based systems are both designed around a concept that they are sent all orders by the broker/client for pre-trade checking. An example of this is presented in FIGS. 1A-B. FIG. 1A presents an example scenario 10, in which an unchecked market order is transmitted from a non-exchange member trading entity 12 to a pre-trade risk platform 16 via a broker connectivity network 14. The pre-trade risk platform 16, having determined that the trade is valid (e.g., satisfies one or more risk criteria), routes the trade to an exchange venue 18. Conversely, FIG. 1B presents a scenario 11 in which it is determined that the trade is invalid (e.g., does not satisfy one or more risk criteria), and the trade is not sent on to the exchange venue 18. These figures generally illustrate the arrangement used for most software-based and FFEH-based risk systems, in which all trades are sent to the pre-trade risk platform before being sent to the market venue. In this arrangement, the software-based or FFEH-based system alone can decide whether to forward the order to a particular market venue or to prevent its submission. The client/broker operates knowing that the risk system in question is checking every order that they generate and they will accordingly expect a detailed message from the pre-trade risk system as to whether the order has been sent to market or rejected because it has breached one or more pre-programmed risk criteria. The detailed message from the risk system (whether acceptance or rejection) allows the broker/client to react seamlessly to the risk checking of its order flow. In addition, because the software-based or FFEH-based system is being sent every order for pre-trade risk checking, it is able to maintain the 'state' of every broker/client's risk position because it is able to record each order, rejection or execution. Software-based and FFEH-based systems are only able to achieve this higher level of risk assessment because they maintain connections with the downstream market venue. The pre-trade risk system not only checks and forwards any orders to a venue but it also monitors any rejections or trade executions by the same venue. In being able to view both the orders and executions, this results in the system being able to give an accurate 'mark to market' intra-day real-time risk assessment as demanded by regulatory authorities.

In contrast, packet sniffers are not specifically sent every order by the client/broker with a view to checking its validity. Instead, packet sniffers are designed to monitor the transit routes (copper or optical fiber links) between a client/broker generating the order and the market venue to which they are being sent. In other words, the packet sniffer does entirely what its name suggests, and seeks to interrogate every packet of data that might be making up an element of a market order and then checks its validity against a pre-defined set of risk criteria. Consequently, because a packet sniffer does not interact directly with any other venue or participant, they are far cheaper to implement and operate.

For example, should an order be sent with an erroneous price of $20,000 per share when the current share price is $200 per share, the packet sniffer will operate in the following fashion:

1. In the instance of it monitoring an optical fiber link, the packet sniffer will first convert the optical signals into electrical signals so that it can analyze the data within each packet. It will then monitor the line in real-time and note when a packet of data includes a tag for a new market order.

2. Upon seeing a packet containing the start of a new market order, it will logically be pre-programmed to then expect a number of the following elements to make up the complete order information, e.g., Order ID, Market, Instrument ID, Direction (Buy/Sell), Price, etc. In certain embodiments, the fields that make up an order can include: Price, Amount, Direction (buy or sell), Instrument ID, Market ID, Order type/Time in Force, Order ID & Market Participant ID.

3. As it reads each subsequent packet of data containing the elements making up the whole order it will then check the validity of each packet value against a pre-programmed risk value.

4. In this example, it will see a price of $20,000 per share and will realize it should be rejected for a price threshold breach (as the current share price is $200).

5. Noting that the whole order should not be sent to market containing all its current values, the packet sniffer needs a method of preventing the order being accepted as valid by the market venue.

Rather like watching a train passing by (with the packets of data that make up the order residing in each "carriage"), the packet sniffer is aware that it may already have potentially let a number of carriages containing permissible data to pass by when it now views a carriage containing the offending $20,000 order share price data packet.

Given that it is impossible to "call back" the carriages containing real-time data packet elements of the offending order (that have already been inspected and passed by the pre-trade risk function in real-time), the packet sniffer operates on the principle of ensuring that even if the order reaches the trading venue, that there is no way in which the venue will accept the order.

6. To achieve this trading venue order rejection 'action', the packet sniffer upon viewing an order containing an element outside of the agreed risk tolerances, is programmed to automatically corrupt the last packet of data that will make up the complete order message.

This is achieved by reversing the (now corrupted) data packet from an electrical signal back to an optical signal and then passing this data packet back onto the optical link for delivery to the market venue. In corrupting the last packet of data, the packet sniffer ensures that the market venue will reject the entire order containing the Order Share Price of $20,000 per share.

This is possible because each market venue, when receiving a new market order, reads all the elements making up the order sequentially and operates on the basis that all the elements must be present before it will forward the new order message to the market order book (exchange). Consequently, by corrupting the very last packet of data making up the order, the packet sniffer is able to ensure the entire order is rejected by the market venue.

Figure 2A:
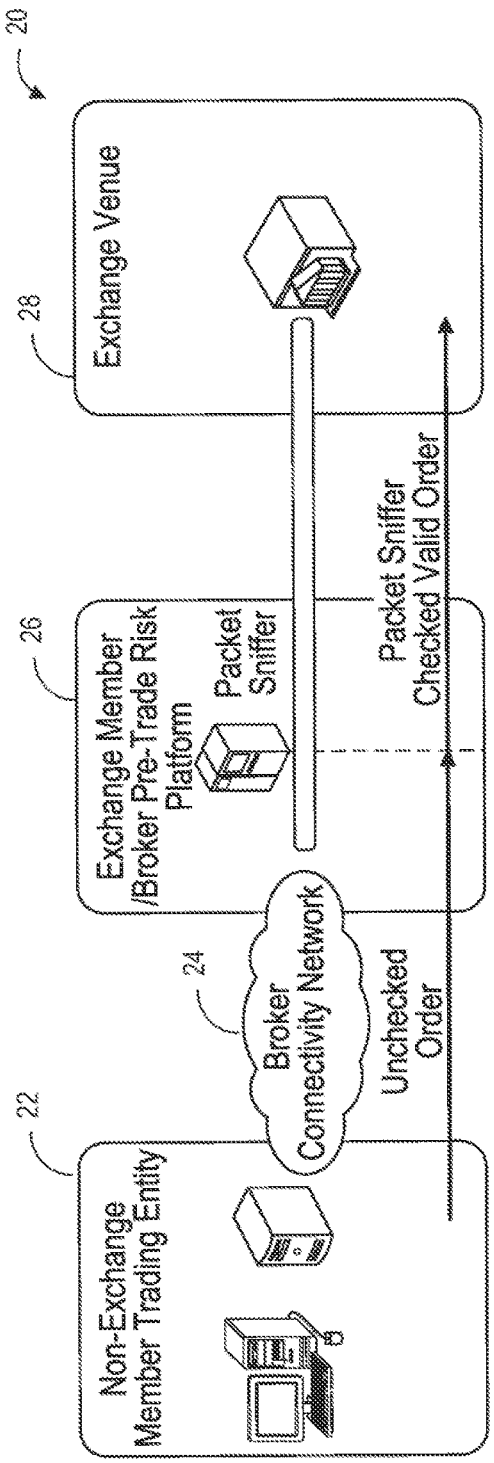
FIGS. 2A and 2B illustrate example scenarios associated with a packet sniffer-based risk assessment for a market order from an automated trading system.
Figure 2B:
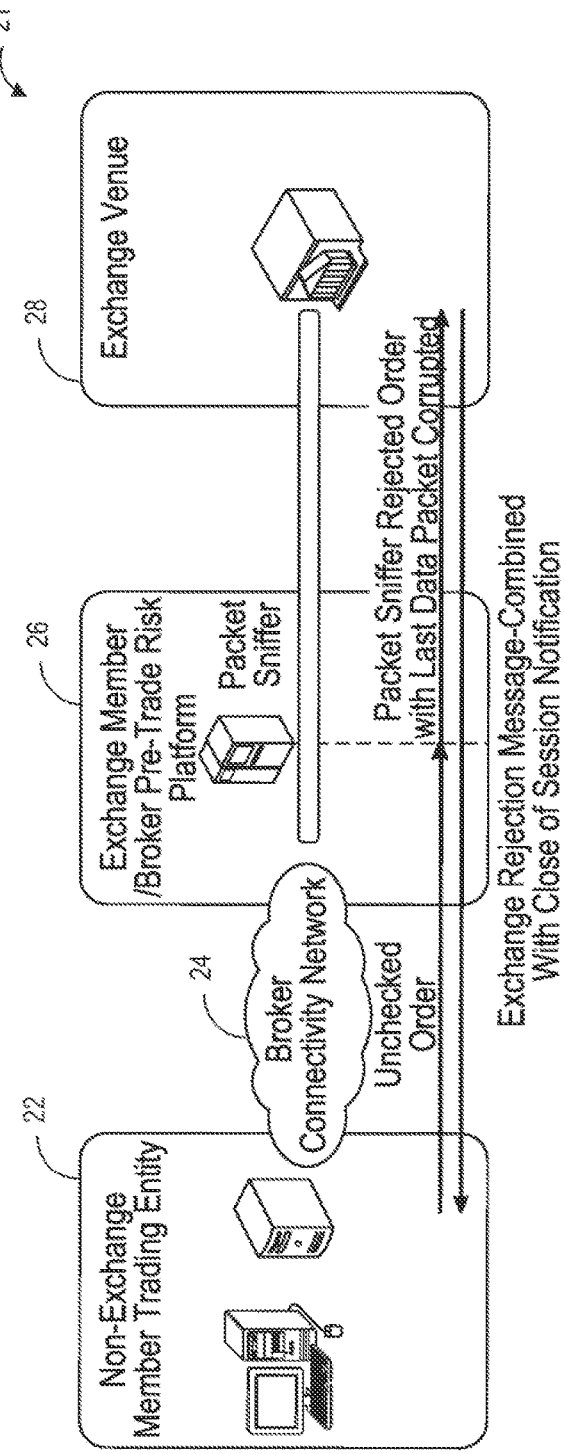

FIGS. 2A-B depict example scenarios 20 and 21, respectively, in which packet sniffers have been implemented to perform pre-trade risk assessment. An unchecked order is transmitted from a non-exchange member trading entity 22 to an exchange venue 28 via a broker connectivity network 24. En route to the exchange venue 28, the unchecked order is picked up by a packet sniffer 26 to perform risk assessment. In scenario 20, the order is determined to be valid (e.g., satisfies trade risk criteria), and is placed back on the network for continued transmission to the exchange venue 28. However, in scenario 21, the order is determined to be invalid (e.g., does not satisfy trade risk criteria), and the rejected order is transmitted to the exchange venue 28 with the last data packet corrupted, such that the trade cannot be executed at the exchange venue 28.

Overall, this method of using a packet sniffer to check the validity of market venue orders appears superficially to achieve the required results in that it is able to check and prevent erroneous orders entering a market. It achieves this with a latency figure of approximately 250 ns, which is at least 4 times faster than FFEH-based solutions or 200 times faster than software-based pre-trade risk solutions.

However, there are a number of issues concerning the use of packet sniffing devices for performing pre-trade risk checks, some of which are detailed as follows:

1. Packet sniffers are only able to view orders in real-time and, as a consequence, they are not able to provide all the pre-trade risk calculations as prescribed within the legislation and market directives implemented since 2010. Specifically, a packet sniffer is only able to 'listen' to order traffic as it travels towards a market venue. It does not listen for acknowledgements from a venue and therefore is not able to track the status of an order. Essentially, packet sniffers are only really efficient at preventing erroneous orders and are not capable of gauging and preventing intra-day risk exposure.

2. The activity of sending a corrupted message to a market venue in order to prevent the entry of an erroneous order is not without its own consequences. This is because, upon receipt of a corrupted message, the market venue will automatically disconnect the user's trading session in order to preserve the integrity of the trading venue itself. This can result in two potential outcomes:

I. The broker/client is disconnected from the venue and is left unable to interact with any other valid orders that they might have previously submitted to the venue and they are left equally unable to send any further orders until the session connection is re-established.

II. The broker/client experiences what is known as a 'cancel on disconnect' scenario whereby the trading venue will automatically cancel all orders previously sent by that trading session, even if they are valid within the order book. The broker client will equally be unable to send any further orders until the session is re-established.

In either scenario, the broker/client is left without a live trading session and is either unable to access their existing orders or will have their entire order book cancelled by the market venue. Secondly, by sending a deliberately corrupted message to the market venue, the broker/client is not acting in a manner which should be encouraged. They are not performing a graceful interaction with either the market venue nor the trading participant that sent the erroneous order, and are relying on the trading venue to react to their deliberately corrupted message in order to prevent a potentially catastrophic event occurring within a market venue. Specifically the broker/client is knowingly sending an order to a market venue without any intention of having the order executed.

3. As a consequence of not being able to track orders being sent to a market venue, a packet sniffer is not able to maintain the status of orders and is also unable to track the intra-day risk profile of a broker's client. However, SEC 15c3-5 specifically states that:

A broker or dealer with market access, or that provides a customer or any other person with access to an exchange or ATS through use of its Market Participant Identifier (MPID) or otherwise, shall establish, document, and maintain a system of risk management controls and supervisory procedures reasonably designed to manage the financial, regulatory, and other risks, such as legal and operational risks, of this business activity.

It is clear that packet sniffers as currently deployed are not meeting all the legislator's requirements. This is especially true when it is noted that Market Access Rule 15c3-5 also states:

(1) The risk management controls and supervisory procedures shall be reasonably designed to systematically limit the financial exposure of the broker or dealer that could arise as a result of market access, including being reasonably designed to:

(i) prevent the entry of orders that exceed appropriate pre-set credit or capital thresholds in the aggregate for each customer and the broker or dealer and, where appropriate, more finely-tuned by sector, security, or otherwise by rejecting orders if such orders would exceed the applicable credit or capital thresholds; and (ii) prevent the entry of erroneous orders, by rejecting orders that exceed appropriate price or size parameters, on an order-by-order basis or over a short period of time, or that indicate duplicative orders.

Packet sniffers can therefore be viewed as a response to merely one section of the recent market directives (the prevention of erroneous orders) and are not a solution to all of the recent legislation requiring the tracking of risk exposure on an aggregated daily basis.

Overall, when analyzing current pre-trade risk platforms, it becomes clear that none of the above solutions, i.e., software-based applications, FFEH-based solutions, and packet sniffer-based solutions, are providing all the elements that market participants and market governance require. For example, software-based solutions are relatively inexpensive to deliver and offer a full range of pre-trade risk functionality but are extremely slow in performing these functions when compared to other solutions. FFEH-based solutions provide the functionality and the speed of the analysis required by participants but they are slow to develop and very expensive to maintain. Finally, packet sniffer-based solutions provide exceptional latency performance and are relatively cheap to develop and operate, but do not actually cover all the pre-trade risk calculations as required by relevant legislation and directives.

Accordingly, what the marketplace concerning pre-trade risk requires is a system that encapsulates all the best elements of a current software, hardware and packet sniffing solutions, i.e., (i) a low latency solution acceptable to market trading participants; (ii) a solution that meets the requirements of the legislators and the governing bodies and includes all the necessary pre-trade risk calculations; and (iii) a solution that is inexpensive and fast to develop, easy to deploy and inexpensive to operate on an ongoing basis.

The presently disclosed technology overcomes the foregoing and other disadvantages associated with conventional approaches. In certain embodiments, the presently disclosed technology utilizes a Programmable Logic Device (PLD) microchip embedded risk assessment system and method and it is in this context that the disclosure will be described. It will be appreciated, however, that the system and method has greater utility since the embedded system may be implemented in other architectures, with other embedded systems and implementations and/or in other manners than those disclosed below, but that which are within the scope of the disclosure.

When analyzing the elements in FIGS. 1A, 1B, 2A, and 2B, which detail how software-based, FFEH-based and packet sniffer-based solutions generally execute pre-trade risk checks on broker/client orders, it can be seen that each existing method analyses pre-trade risk subsequent to and in isolation from an automated trade system ("ATS") that has originated the order. The order is conceived by the ATS and then onward forwarded, and risk is calculated on a separate appliance regardless of whether the risk calculations are written in software or are written into a hardware-based system.

Therefore, even if one ignores the fact that FFEH-based systems and packet sniffers are faster than software-based systems in providing risk calculations, one of the features adding latency between the inception of the order in the ATS and the time it takes to reach a market venue, is not just the time taken to calculate the pre-trade risk, but also the time it takes to send the orders from the ATS to the pre-trade risk appliance for checking. This latency issue is also exacerbated by the fact that many current commercially available pre-trade systems require the ATS system to generate the whole order prior to sending. Consequently, this means that the ATS must, for example, compile at least 8 different fields for each order (as described above) to complete the order details, prior to forwarding it for onward pre-trade risk analysis. Therefore, in a landscape where latency is critical to the success or failure of a pre-trade risk system, the presently disclosed systems and methods can reduce the time between an order being initiated and it being risk-checked and then forwarded to a market venue for possible execution. Thus, systems and methods are provided for allowing a pre-trade risk system to interact with the ATS in order to reduce the operational latency.

To a large extent most currently existing ATS's have been written to operate on Intel X86 processors and, to this end, Intel X86 processors will be discussed within the examples of this disclosure. However, it should be noted that the systems and methods for analyzing pre-trade risk disclosed herein could be applied to any operating system, such as, for example, Sparc, A R M, and Power, etc. Furthermore, the system and method may be implemented on other processors as well.

In terms of an ATS, Intel X86 processors are normally housed in servers and allow the operators to receive market data streams across one or more communications channels, such as an Ethernet port housed within the server, and then to create orders to be sent to a market venue based upon a pre-programmed trading strategy. These orders will be generally sent to a pre-trade risk system across the same Ethernet port that has received the market data. However, as already discussed, when a packet sniffer is used for pre-trade risk checking, the order will be interrogated on its path towards the execution venue and the packet sniffer will not be the specific target of the completed order sent from the ATS. Ordinarily, an ATS is loaded into the storage area of the server from which, upon start-up, it is then loaded into cache memory. When new orders are created, this is generally as a result of a pre-programmed reaction by the ATS to information received as part of the market data stream.

At server level, when the ATS is listening to the market data streams, it will be doing to so with a view of expecting to see a 'trigger point', which would be its pre-programmed point to generate, amend or cancel an order to market. In terms of a new order, when such a trigger point is observed by the trading application, it will immediately begin (based upon its pre-programmed logic) to write the new order information into what is known as an L1 cache which resides on the X86 CPU. The L1 cache is designed to ensure that the application running on the X86 CPU is not left waiting for the next piece of information that it requires. Therefore in this instance, the application writes the order to the L1 cache because this is the highest level of cached memory and from where the application knows this order information will also be required again. Consequently, once the order is fully written out within the L1 cache, the CPU will then copy the order instructions into a dynamic random-access memory (DRAM) housed within the server. Within the DRAM memory space, the order instruction will be fully formatted for forwarding across the internal bus to a network interface card (NIC), from where it exits the server and will be onward forwarded to the either a pre-trade risk checking device or the market venue.

As can be seen, therefore, the X86 based server writes the new order instructions into memory on two separate occasions, first when it writes to the L1 cache in the X86 processor and then again when this information is formatted within the DRAM. Formatting within the DRAM would most likely involve formatting the order into the protocol used by the downstream market venue so that the order can be read by the venue and placed into the order book. The presently disclosed system, in certain embodiments, can utilize these two write events in order to reduce the overall end-to-end latency from the ATS to the pre-trade risk application and subsequently to the market venue.

In certain embodiments, the presently disclosed technology takes advantage of the fact that the ATS initiating the order writes an order message out twice, before forwarding it to a pre-trade risk system for interrogation. The presently disclosed technology can also take advantage of the fact that during the process of interrogation, the pre-trade risk system may also write the order out as part of its own internal order inspection process. In the case of a pre-trade risk system that also provides intra-day risk positions (e.g., software-based and FFEH-based systems), the system can also convert the order message into the appropriate protocol of the market venue (because it will manage the downstream market venue session). Consequently, the order may be written out four times before it reaches its intended market destination. In certain embodiments, the presently disclosed technology can be designed to reduce the number of times that the order is written down in order to provide a more expeditious pre-trade risk inspection process.

Accordingly, a new design approach can, for example, inspect the order as it is written out in the L1 cache and/or DRAM by the ATS. This operation of the system and method eliminates the sequential transcribing of the order as occurs within current pre-trade risk devices and also eliminates unnecessary traffic caused by the transfer of erroneous orders.

In certain embodiments, the systems and methods described herein can either read an order as it is written in the ATS X86 L1 cache or read the order as it would subsequently appear within the ATS X86 server DRAM, prior to it being forwarded from the ATS NIC to the market venue. However, it was quickly recognized that there would be a number of technical obstacles to overcome if a pre-trade risk device was to be able to inspect the internal memory of an X86 based ATS and also provide dynamic risk checks as the ATS device was writing its new orders into memory. Some of these technical obstacles are outlined and addressed below.

Technical Issues

One issue to overcome was one of speed. In terms of pre-trade risk systems, speed is defined in terms of latency, i.e., the time taken for any hardware or software component within the system to start and finish its task. According to the task and the speed of the component, for the majority of pre-trade risk systems, latency (as discussed above) is usually measured in anything between milliseconds (ms), microseconds (us) or nanoseconds (ns). Therefore, in terms of pre-trade risk platforms, a lower latency figure is a sign of improved system performance. If the intention was to risk check the order messages as they were being written out in memory by the X86-based ATS (as part of its standard function), then the main issue would be in extracting these orders from the ATS memory, then executing the pre-trade risk checks as required and, if need be, sending cancellation messages back to the ATS system prior to any of the erroneous orders being sent by the ATS to the market venue for potential execution. An important issue if the ATS dynamic memory (e.g., the L1 cache or DRAM) is going to be used as the source of data for the pre-trade risk system is that the pre-trade risk system would, ideally, be quicker than an X86 CPU housed in a standard server configuration. Given the speed of existing X86 processors, it may be the case that an FPGA can provide the speed demanded by this purpose. However, it should be noted that for the purposes of this disclosure, the proposed system and method could be applied to a number of other hardware devices without departing from the present disclosure.

In certain embodiments, it may be the case that an FPGA provides beneficial advantages, as the FPGA has the ability to process vast amounts of information concurrently, as opposed to X86 architectures which can only process data sequentially. The ability to concurrently process information provides the FPGA with superior operational latency over the X86 processor operating the ATS. Therefore, this allows for the FPGA to provide the pre-trade risk functions more quickly than the X86 processor can provide its own internal calculations (of checking market data stream and triggering orders). Consequently, the increased processing power and latency performance of the FPGA can allow the risk application housed within it to interact with the X86 ATS with either minimal or no impact in terms of additional latency.

A secondary reason why an FPGA device may be used for interrogating the X86 ATS application is that the risk system contained in the FPGA would not require any systems resources within the X86 server architecture. In other words, the FPGA could provide all the risk checking functions in isolation from the X86 processor housing the ATS.

It should be noted that the present disclosures discusses various designs in which the FPGA is separate from the X86 processor. However, Intel has recently announced the development of an FPGA embedded within an Intel Xeon processor. As a result, it should also be noted that this disclosure could also make use of an FPGA embedded directly into an X86 processor.

Further details of an example of an FPGA that may be used as part of the system described below is described in commonly owned U.S. Pat. No. 8,655,767 and U.S. patent application Ser. No. 14/170,515 which are incorporated herein by reference as if fully set forth herein.

In some embodiments, the system may use a dual (or more) X86 processor server which is able to house both the X86 ATS application and the FPGA hardware device. Given that much of the latency in current pre-trade risk methods exists between the ATS and the risk device, the hardware risk device can be housed within the same physical structure as the X86 ATS application.

Use of a multi-processor device can provide several benefits. For example, multi-processor devices are readily available from a number of separate hardware manufacturers and can use the same X86 chip set as currently used by the majority of ATS operators. As such, use of such devices may have minimal impact on existing brokers/clients, as they could re-deploy their current risk applications after implementing a few minor code changes, which will be discussed in greater detail below. Furthermore, use of existing multi-processor devices negates any requirement for new exotic and costly hardware to be developed, for example, in designing and building bespoke processors for this purpose. Another benefit of using a multi-processor device is that it ensures separation from the respective operational functions of an ATS generating orders and a pre-trade risk system which is checking them. This also means that security controls can be established which prevent the operator of the ATS in being able to access the FPGA and change any of the pre-set risk limits as controlled by the operating broker. Procedures for ensuring these security controls is subsequently detailed in this disclosure.

The actual speed benefit from utilizing a multi-processor device to house both the ATS and pre-trade risk application hardware can differ according to where and how the hardware risk device (e.g., the FPGA) is installed within a X86 multi-processor server architecture. In the example of using an FPGA as the pre-trade risk hardware device as described below, the FPGA itself could be attached to the X86 based server by one of two separate approaches: (1) attaching the FPGA to the server via a PCIe connection (Approach 1), and (2) attaching the FPGA to the server via an Intel Socket G connection (Approach 2). Each of these example embodiments is discussed in greater detail below.

Approach 1

In this first approach, an FPGA is attached to an X86-based system via a PCIe connection. This approach would provide for a nearly hassle-free, and cost-effective installation of the FPGA, as it would require substantially no adaptations to get the hardware device connected. In certain embodiments, an ATS operator can install a new library into an X86-based system containing an API that can create a shadow map of the X86-based system's DRAM (containing the new order) within the FPGA's own memory space. The shadow map would essentially create a (near to) simultaneous copy of the new order from the X86 DRAM into the FPGA's own memory space and organized in a standard format.

The new API can be used as a substitute target for when the ATS is triggering a new order and would ordinarily be moving the order from the L1 cache into the X86 DRAM. For example, instead of the ATS processor writing the order directly from the L1 cache to the DRAM, it would instead deliver the new order message from the L1 cache to the newly installed API. In passing the order from the L1 cache to the new API held within the X86 Processor, this new API could be configured to take responsibility for placing the order into the DRAM. The new API can be configured to provide a standard format as to where and how any new orders would be placed in the DRAM. The benefits of a consistent method of placing the order into the DRAM are that the FPGA would know precisely where to locate the new orders within the DRAM shadow map because it would be assigned to a specific and consistent memory address. This would mean that there would be no additional latency resulting from the FPGA having to search for the order stored in the DRAM, as would occur if the ATS processor was placing the order into the DRAM using a random memory address.

After the new API library has been loaded into the application, this 'First Approach' may involve installing the FPGA in a standard PCIe interface on the X86 based server PCB. The API, while creating the DRAM shadow map in the FPGA, can also be configured to ensure that the security of the FPGA cannot be breached by an ATS operator. This can be achieved, for example, through the specific way in which the FPGA is housed within the PCIe socket. For example, the FPGA to PCIe socket connector can be designed to use only the pins that are applicable in creating a shadow map within the FPGA and also in sending back order cancellation instruction to the ATS. This would prevent access by the ATS to the risk assessment functions contained within the FPGA.

Upon inspecting the order in the DRAM shadow map, the FPGA could execute over 40 separate risk checks (as subsequently listed in this disclosure). The results of these risk checks could subsequently result in various actions by the FPGA (according to how both the ATS and FPGA operators would prefer the overall system to be configured).

One potential downside of this approach is that, in using the PCIe interface within the X86 server, the FPGA would be technically limited to only being able to access the ATS new order instructions as they appear within the X86 system DRAM. The FPGA would not be able to access new order instructions from the L1 cache. An FPGA housed within a PCIe interface can only access the order in DRAM due to generic technical constraints within X86 architectures that determine which components can access each other and at what level within the system memory hierarchy.

Given that DRAM is the second place in which the order will be listed in the ATS memory, it may be the case that being limited to reading the order from DRAM, rather than the L1 cache (which is the first memory store for any new order) results in added latency. Furthermore, by having the FPGA utilize an ATS X86 DRAM shadow map for accessing ATS orders, this also means that the FPGA may be required to use either the PCIe bus or other communication channel on the server board for creating the shadow map. These may not be the fastest routes available between processors within X86 architectures. As such, Approach 1 may not be as latency efficient as Approach 2, described in greater detail below, but provides the benefit of being more cost-effective and easier to install.

One key choice in configuration for this approach could be determining whether the ATS would be submitting the order to the downstream market venue, or whether the FPGA would be responsible for forwarding the order to the market venue. One additional consideration may comprise determining which processor (ATS/X86 or FPGA) would be responsible for handling the session connection with the market venue that would provide the venue's response to the orders.

Figure 3:
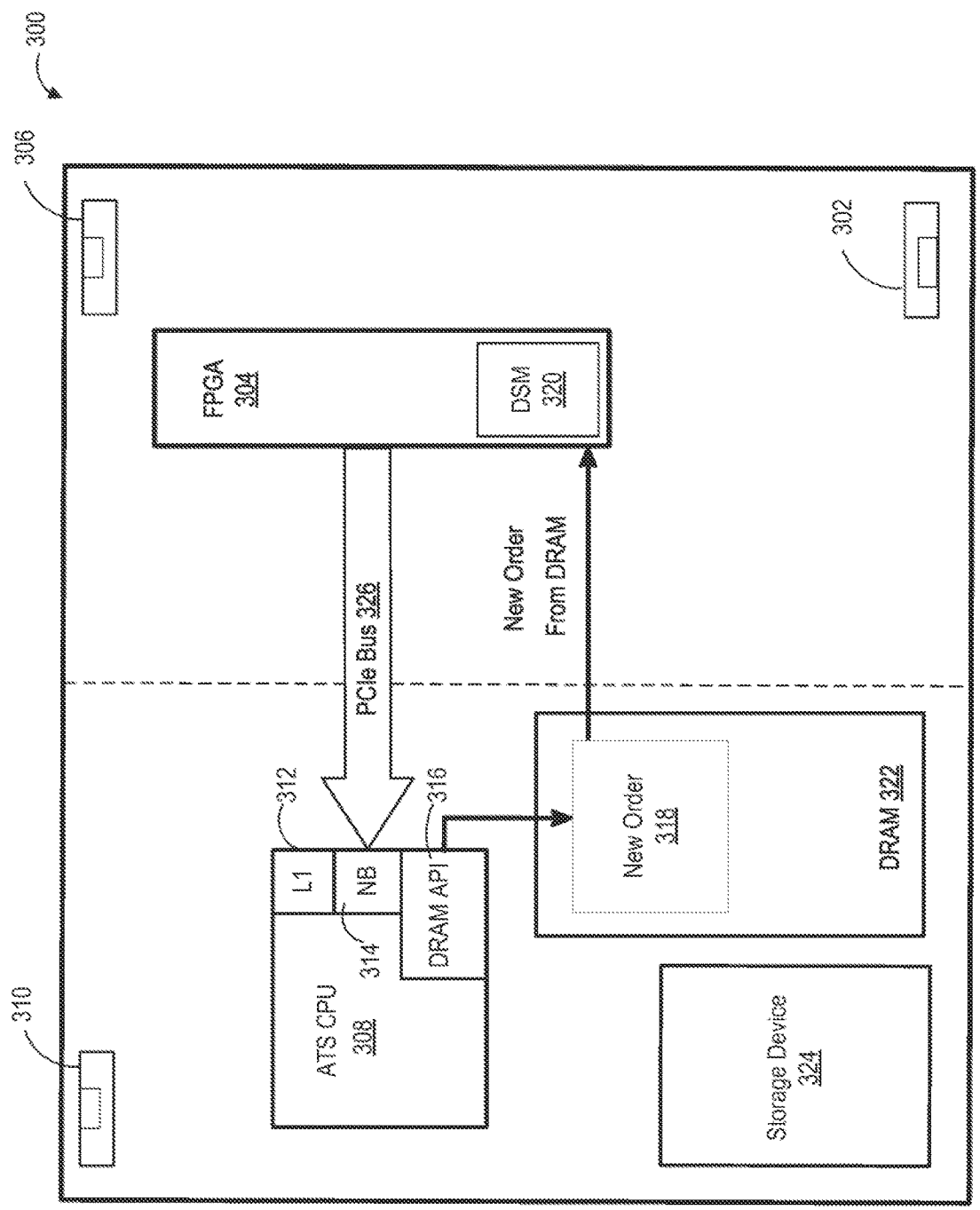
FIG. 3 illustrates an example risk assessment system including an FPGA installed via a PCIe interface, according to an embodiment of the present disclosure.

Approach 1—Possible Configurations for Approach 1 and Possible Actions of the FPGA to Receiving a New Order The configurations of the first approach are described with reference to FIG. 3 that illustrates an example of an X86 CPU-based system 300 with an FPGA risk assessment device housed in a PCIe socket. Further, FIG. 3 illustrates an example of other components of the system that incorporate the X86 CPU with an FPGA risk assessment device housed in a PCIe socket. In the example in FIG. 3, the ATS may be implemented as an X86 processor that may execute a trading algorithm of a particular client.

The system 300 can include an FPGA 304 and an ATS CPU 308 which can be, for example, an X86 CPU. The ATS CPU 308 can include an L1 cache 312, a Northbridge 314, and can also store a DRAM API 316 for placing orders into a DRAM 322. As discussed above, the DRAM API 316 can be configured to place a new order 318 into the DRAM in a predictable location, rather than randomly placing new orders in DRAM, such that when the new order 318 is copied into a DRAM shadow map 320 stored on the FPGA 304, the FPGA 304 can quickly retrieve the new order rather than having to search to find it. The system 300 can also include a storage device 324 for storing a client's trading algorithm.

A 10 Gb Ethernet connection 302 can be utilized to connect the FPGA 304 to a market venue, and allows the FPGA 304 to pass orders to the market venue and also to handle the venue session. In this configuration, if an order was in breach of its pre-programmed limits, the FPGA 304 that holds and executes pre-trade risk assessment operations (such as by using VHDL in one example) may simply cancel the order and record this cancellation into its own memory for use by a Command and Control GUI (connected via a 1 Gb Ethernet connection 306) that would interface with the FPGA 304 for providing risk reports and configuration controls to the venue member broker. Therefore, in this scenario the FPGA 304 does not have to send a cancellation message back to the ATS CPU 308. Accordingly, the ATS CPU 308 would logically assume that because no order acknowledgment message was passed back from a market venue via the FPGA 304, that its order had been cancelled by the FPGA risk system.

In another embodiment, the FPGA 304, when controlling the order flow to the market venue and also the venue session, could follow the exact same process as above, but, in this embodiment, it could also provide a cancellation message via, for example, a PCIe Bus 326, to the ATS notifying that the last order had breached its limits. This would allow the ATS to automatically adjust its own status of the order.

In various embodiments, the FPGA 304, when controlling the order flow to the market venue and also the venue session, may, when the FPGA 304 deems the order is okay for risk, submit the order to the market venue. In this instance the FPGA 304 would pass back the corresponding acknowledgement of order placement or trade execution from the market venue received via the Ethernet connection 302 to the ATS CPU 308. The FPGA would also record this valid order/execution into its own memory for use by the Command and Control GUI (connected by the Ethernet port 306).

In other embodiments, rather than the FPGA 304 being charged with forwarding market orders and/or maintaining the venue session, the ATS CPU 308 may forward orders to the market venue and maintain session connection with the market venue via its own 10 Gb Ethernet port 310. In this configuration, if an order was in breach of its limits, the FPGA 304 could pass back a cancellation instruction to the ATS CPU 308 via the PCIe Bus 326 (the technical method of cancellation will be discussed in greater detail herein). Upon notifying the ATS CPU 308 of the instruction to cancel the order, the FPGA 304 could also record the cancellation instruction for use by the Command and Control GUI via drop copy.

In some embodiments in which the ATS CPU 308 forwards orders to the market venue and with the ATS CPU 308 also maintaining the session connection with the market venue, the FPGA 304 may take an action when a valid order was received. In this scenario, the FPGA 304 could record the valid order in its memory for inspection by the Command and Control GUI (via Ethernet port 306) but it would not send any acknowledgement to the ATS CPU 308. This would mean that the ATS CPU 308 would automatically send the order to the market venue via Ethernet port 310 because, without a cancellation message from the FPGA 304, it would assume that the order was within its risk limits.

The notice of cancellation and the instruction to cancel described above between the FPGA 304 and the ATS CPU 308 can be delivered from the FPGA PCIe Bus 326 via the Northbridge 314 as shown in FIG. 3. The Northbridge 314 is defined as either a separate microchip contained on motherboards (PCB) which is connected directly to the X86 CPU or alternatively it can be integrated directly on the processor. The purpose of the Northbridge 314 is to provide fastest communication between the ATS CPU 308 and other components contained on a motherboard, i.e., to act as the CPU system agent for memory. The Northbridge 314 can be used for communicating the notice of cancellation and also the instruction to cancel an order from the FPGA 314 pre-trade risk controller to the ATS CPU 308.

The method of sending an order cancellation instruction from the FPGA 304 to the ATS CPU 308 may be accomplished by a system interrupt. A system interrupt is defined as a signal to the CPU instigated by hardware or software indicating that an event that needs immediate attention. In this disclosure a system interrupt is a signal to the ATS CPU 308 from the FPGA 304 indicating that an event that needs immediate attention (in this case that the latest order would breach risk limits and needs to be cancelled). The interrupt would alert the ATS CPU 308 to a high-priority issue requiring the interruption of the current code that the processor is executing, i.e., the order currently being generated within the ATS CPU 308 and which has just been examined by the FPGA 304. The ATS CPU 308 responds to the interrupt by suspending its current activities and executing a function called an interrupt handler (or an interrupt service routine, ISR) to deal with this interrupt message. This system interruption is however only temporary, and, after the interrupt handler finishes its routine (i.e. cancels the order), the ATS CPU 308 would resume its normal activities, e.g., checking market data streams for possible order trigger points.

The use of an interrupt by the FPGA 304 to communicate with the ATS CPU 308 may be advantageous because an interrupt message received by the ATS CPU 308 cannot be ignored by the ATS CPU 308. This means that when response time from an X86 processor is critical (as is the case when cancelling an erroneous order before it is sent to a market venue), the system interrupt message guarantees that the ATS CPU 308 responds to the cancellation instruction immediately when it is sent from the FPGA 304. Therefore, this ensures that an erroneous order and any orders outside of risk limits are cancelled in the ATS 308 prior to them being transmitted to the market venue.

Figure 5A:
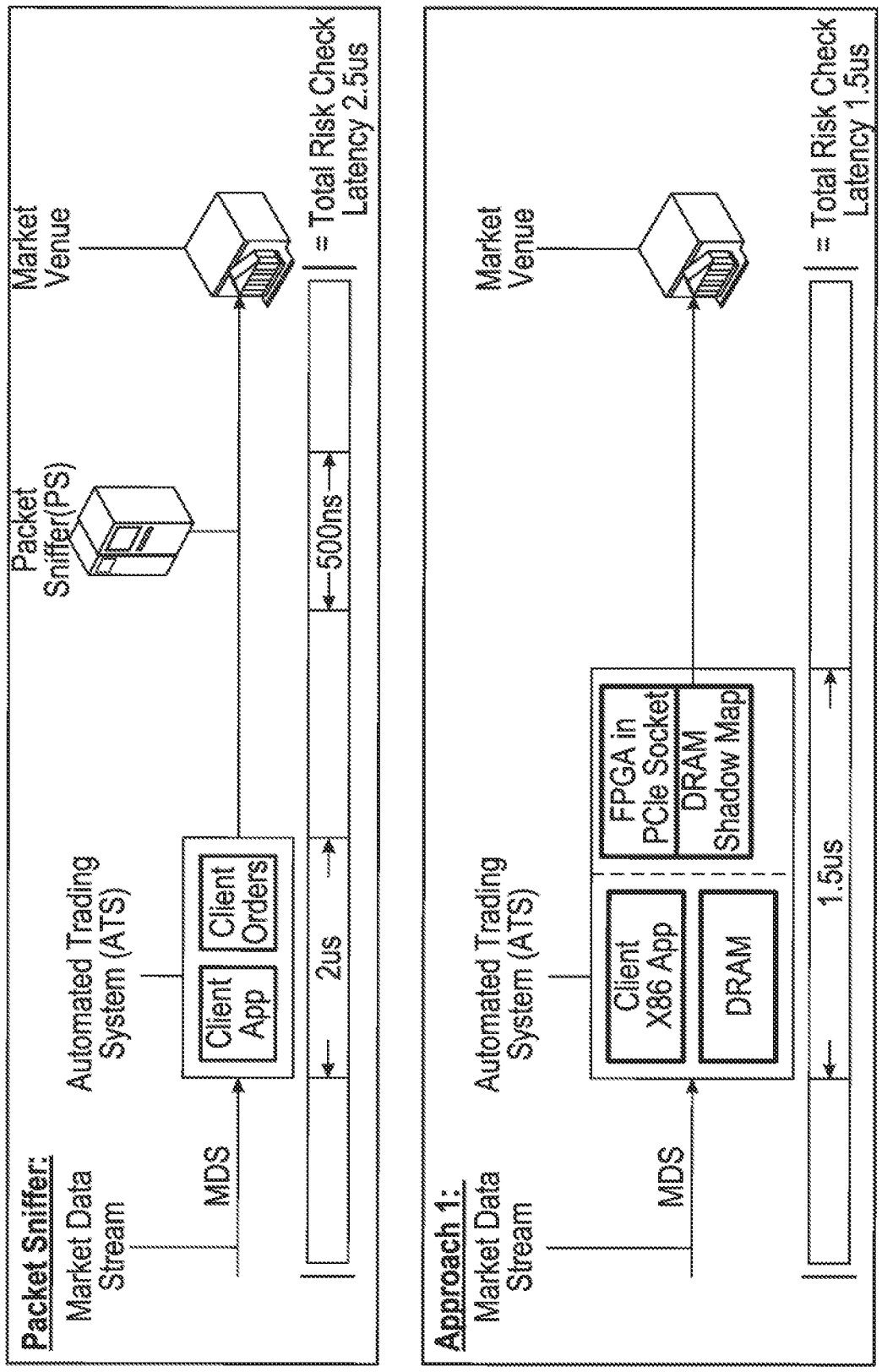
FIGS. 5A and 5B illustrate latency comparisons of pre-trade risk processing of various risk assessment systems.

As can be seen in FIG. 5A, it is estimated that this Approach 1 configuration would provide significant latency improvements over existing packet sniffer systems. The latency improvements would occur as a result of enabling the FPGA to risk check the orders from the X86 DRAM shadow map in approximately 1.5 us. It is estimated that this would be at least 40% faster than the very quickest packet sniffer configuration currently in operation and this would still be faster despite the new method executing at least 5 times the amount of risk checks as current packet sniffer systems provide. The list of the pre-trade risk checks available within the Approach 1, as well as in Approach 2 (described in greater detail below), are listed in Table I.

TABLE I

Risk Calculations via the FFEH FPGA Device

| Risk Check or Restriction Type or Throttle Type | Risk Check, Restriction or Throttle Available (Yes/No) |
|---|---|
| General Restrictions | |
| Stop Trading | Yes |
| Market Hours | Yes |
| Symbol Restrictions | |
| Invalid Instrument | Yes |
| Buy Restricted | Yes |
| Sell Restricted | Yes |
| Short Sell Restricted | Yes |
| IPO Restricted | Yes |
| Side Capacity Restrictions (Client) | |
| Incorrect Capacity | Yes |
| Short Sell Exempt Allowed | Yes |
| Short Sell Restricted (CSS) | Yes |
| Buy Restricted | Yes |
| Sell Restricted | Yes |
| Agency Buy Restricted | Yes |
| Agency Sell Restricted | Yes |
| Agency Short Sell Restricted | Yes |
| Principal Buy Restricted | Yes |
| Principal Sell Restricted | Yes |
| Principal Short Sell Restricted | Yes |
| Quantity Restrictions | |
| Minimum Quantity per Order | Yes |
| Maximum Quantity per Order | Yes |
| Maximum ADV per Order | Yes |
| Maximum Outstanding per Order | Yes |
| Consideration | |
| Minimum Consideration per Order | Yes |
| Maximum Consideration per Order | Yes |
| Daily Gross Consideration (Session) | Yes |
| Daily Gross Consideration (Client or Session) | Yes |
| Price Deviation | |
| Price Deviation per Symbol | Yes |
| Aggressive Price Deviation Only | Yes |
| Protocol Restrictions | |
| Market Orders Allowed | Yes |
| Invalid Time in Force | Yes |
| Invalid TIF/Order Combination | Yes |

TABLE I-continued

Risk Calculations via the FFEH FPGA Device

| Risk Check or Restriction Type or Throttle Type | Risk Check, Restriction or Throttle Available (Yes/No) |
|---|---|
| Invalid Order Type | Yes |
| Invalid Lot Size | Yes |
| Invalid Tick Size {Table} | Yes |
| ISO Orders Allowed | Yes |
| Short Sell Checks | |
| Locate Required (Tag 114) | Yes |
| Broker ID Present (Tag 5700) | Yes |
| Short Sell Checks for SSE Orders | Yes |
| Throttling | |
| Session Throttle | Yes |
| Stock Throttle | Yes |
| Concurrent Orders per Symbol per Side | Yes |
| SAMSN Reject | Yes |
| Persisted Overrides | |
| Force Capacity Cancellation | Yes |
| Cancel Single | Yes |
| Cancel All | Yes |

Approach 2

Figure 4:
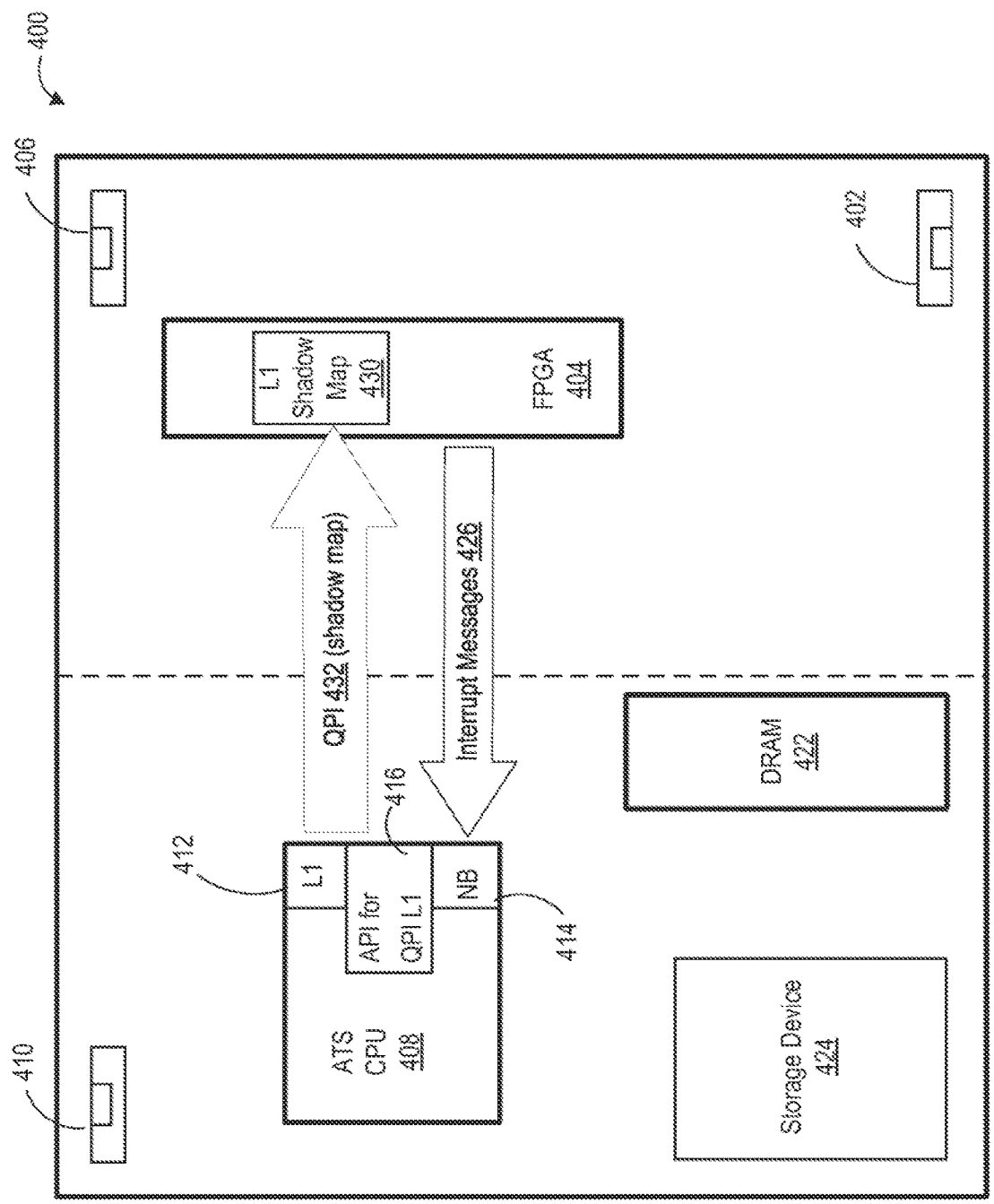
FIG. 4 illustrates an example risk assessment system including an FPGA installed via an Intel Socket G connection, according to an embodiment of the present disclosure.

An example of another exemplary configuration, which will referred to as "Approach 2," is illustrated in FIG. 4, which depicts an example scenario 400 including an ATS CPU 408 and an FPGA pre-trade risk assessment device 404, which, in this arrangement, is housed in an Intel Socket G connection.

In Approach 2, a new library could once again be installed containing a new API (block 416 in FIG. 4) that would create a shadow map 430 of an L1 cache 412 within the FPGA 404. Approach 2 differs from Approach 1 in that, in this case, the shadow map 430 stored on the FPGA 404 would be of the L1 cache 412 rather than the DRAM 422.

The API 416 can be configured such that when the ATS CPU 408 wishes to create a new order, rather than writing the order directly into the L1 cache 412, the ATS CPU 408 would deliver the new order message to the new API 416. In passing the order to the new API 416, this new API 416 would then take responsibility for placing the order to a predictable location on the L1 cache 412. The benefit of using this new API 416 is that it would provide a standard method as to where and how the new order would be placed in the L1 cache 412. The benefits of a consistent method of placing the order into the L1 cache 412 are that the FPGA 404 would know precisely where to locate the new orders within the L1 shadow map 430. This would again mean that there would be no additional latency resulting from the FPGA 404 having to search for the order stored in the L1 shadow map 430 (as would occur if the ATS was placing the order into the L1 cache itself in a random fashion).

The Approach 2 solution would also differ from Approach 1 in that it would involve installing the FPGA 404 in an Intel Socket G on the multi-processor X86 server, rather than the PCIe socket (as per Approach 1). In the Approach 2 configuration, a first ATS CPU 408 (which could be an X86 processor) would be dedicated to the Broker/Client ATS software application, and a second X86 processor would be removed from the server to make room for the FPGA 404. Once the second X86 processor is removed, the FPGA 404 could be connected to the now empty second Intel Socket G by means of a bespoke FPGA to Intel Socket G convertor. By having the convertor connect the FPGA 404 to the Intel G Socket, this configuration would allow for the creation of a shadow map 430 of the L1 cache 412 within the FPGA 404. As discussed previously, a configuration in which the FPGA 404 was housed in the PCIe socket (as per Approach 1) would only enable shadow mapping of the DRAM.

Security between the ATS housed on the ATS CPU 408 and the risk system housed within the FPGA 404 would be controlled by the bespoke Socket G convertor. The design of the convertor, much like the design of PCIe connector in Approach 1, would only contain specific pins that would enable the creation of an L1 shadow map in the FPGA and also for sending cancellation messages and instructions back to the ATS. This would therefore prevent any chance of an ATS operator taking control of the FPGA risk limits.

Approach 2, which allows the FPGA to operate via the Intel Socket G, would also give added latency benefits by being able to utilize what is known as the Intel Quick Path Interconnect (QPI) between the respective Intel sockets (housing both the X86 CPU 408 containing the ATS and separately, the FPGA 404 performing the pre-trade risk checks).

The Intel QPI is defined as a point-to-point processor inter-connect and is generally accepted as being the fastest communication channel between processors in an X86 environment. The QPI is faster than other inter-connect methods because it offers greater bandwidth with lower latency and has also been specifically designed with an efficient architecture including a snoop protocol for optimized lower latency and also greater scalability. A snoop protocol is also often referred to as a bus-snooping protocol. It is primarily used for ensuring cache coherency in symmetric multiprocessing environments. In a typical configuration using a bus snooping protocol, all caches upon a bus will monitor the bus to see if they hold data that is required and/or has been requested by another cache located on the same bus. To achieve this, all the caches monitoring the bus will hold a record of the sharing status of each block of data that it holds. In this instance of using a QPI 432 to connect the L1 cache 412 on the ATS CPU 412 to the L1 cache shadow map 430 on the FPGA 404, the QPI 432 would be configured so that it maintained a continuous copy of the L1 cache 412 (a shadow map) within the FPGA 404, i.e., the new X86 library/API 416 would use the QPI 432 to maintain symmetry between both L1 cache environments.

The use of the QPI has only been possible since it was made open source by Intel, which has now enabled operators to utilize this path between the processor sockets for their own purposes. In this embodiment, the use of the QPI 432 would allow the FPGA 404 to access the L1 cache 412 held on the ATS CPU. As already stated, the L1 cache 412 is the first instance of a new order being written to memory by the ATS application and, accordingly, offers the lowest possible latency for the FPGA 404 to interrogate a new order prior to it being sent to a market venue.

The FPGA 404 may execute the 40+ risk checks (as listed in Table I above) upon a new order held within the L1 shadow map 430.

Again, as was the case with Approach 1, one choice in configuration would be whether the ATS CPU 408 would be submitting the order to the downstream market venue or whether the FPGA 404 would provide this function. It may also need to be determined which system would be also be separately responsible for handling the session connection that would provide the market venue's response to the orders.

Approach 2—Possible Configurations for Approach 2 and Possible Actions of the FPGA to Receiving a New Order In one embodiment, the system 400 includes a 10 Gb Ethernet connection 402 over which the FPGA 404 passes orders to the market venue and also handles the venue session. In this configuration, if an order was in breach of its pre-programmed limits, the FPGA 404 could be designed to simply cancel the order and record this cancellation into its own memory for use by a Command and Control GUI (connected via an Ethernet port 406) that would interface with the FPGA 404 for providing risk reports and configuration controls to a venue member broker. In this scenario, the FPGA 404 could be configured not to send a cancellation message back to the ATS CPU 408. Accordingly, the ATS CPU 408 could logically assume that because no order acknowledgment message was passed back from the market venue via the FPGA 404, that its order had been cancelled by the FPGA risk system.

As with Approach 1, in another embodiment, the FPGA 404 of Approach 2 may control the order flow to the market venue and also the venue session and may provide a cancellation message to the ATS 408 notifying the ATS 408 that the last order had breached its limits. This would allow the ATS 408 to automatically adjust its own status of the order.

In various embodiments, the FPGA 404, when controlling the order flow to the market venue and also the venue session, may, when the FPGA 404 deems an order is okay for risk, submit the order to the market venue via the Ethernet port 402. In this instance the FPGA 404 would pass back the corresponding acknowledgement of order placement or trade execution from the market venue to the ATS CPU 408. The FPGA 404 would also record this valid order/execution into its own memory for use by the Command and Control GUI.

In other embodiments, the ATS CPU 408, rather than the FPGA 404, may forward orders to the market venue and also maintain the session connection with the market venue over another 10 Gb Ethernet port 410. In this configuration, if an order was in breach of its limits, the FPGA 404 could pass back a cancellation instruction 426 to the ATS CPU 408. Upon notifying the ATS CPU 408 of the instruction to cancel the order, the FPGA 404 could also record the cancellation instruction for use by the Command and Control GUI via drop copy.

In some embodiments in which the ATS CPU 408 forwards orders to the market venue and also maintains the session connection with the market venue, the FPGA 404 may take an action when a valid order was received. In this scenario the FPGA 404 could record the valid order in its memory for inspection by the Command and Control GUI but not send any acknowledgement to the ATS CPU 408. This would mean that the ATS CPU 408 would automatically send the order to the market venue because without a cancellation message from the FPGA 404, it would assume that the order was within its risk limits.

As per Approach 1, the notice of cancellation and the instruction to cancel described above delivered between the FPGA 404 and the ATS CPU 408 could be delivered from the FPGA 404 by a standard PCB bus by utilizing a Northbridge 414. Equally, in this Approach 2, they could also be sent by configuring the QPI to perform the same function. However, it may be simpler to implement a standard bus or channel via the Northbridge 414 for communicating the notice of cancellation and also the instruction to cancel an order from the FPGA pre-trade risk controller 404 to the ATS CPU 408 (although the QPI could be used for this function and therefore remains as a possibility).

Again, as described in Approach 1, the process of sending an order cancellation instruction from the FPGA 404 to the ATS CPU 408 could be performed via a system interrupt 426. In this second method of the disclosure, a system interrupt is again a signal to the ATS CPU 408 from the FPGA 404 indicating that an event that needs immediate attention. The interrupt would alert the ATS CPU 408 to a high-priority issue requiring the interruption of the current code that the processor is executing, i.e., the order currently being generated within the ATS CPU 408 and which has just been examined by the FPGA 404 in the L1 shadow map 430. As detailed in Approach 1, the ATS CPU 408 responds to the interrupt by suspending its current activities and executing a function called an interrupt handler (or an interrupt service routine, ISR) to deal with this interrupt message.

The use of an interrupt by the FPGA 404 to communicate with the ATS CPU 408 (from an FPGA interrogating an L1 cache shadow map) can be generated with an exceptionally low latency. By installing the FPGA 404 in the Intel Socket G (which then enables use of the QPI), the L1 shadow map 430 is created in as close to real-time as is possible, i.e., at almost the same time as it is written into the L1 cache 412 itself, by the new API 416.

Again, the system interrupt message guarantees that the ATS CPU 408 responds to the cancellation instruction immediately when it is sent from sent from the FPGA 404. Moreover, due to the overall design of the Approach 2 configuration which enables the FPGA 404 to interrogate the L1 shadow map 430, it enables the FPGA 404 to interact with the ATS CPU 408 before it has completed its own task of generating orders and forwarding them to a market venue. Therefore, this ensures that an erroneous order or any orders outside of risk limits are cancelled in the ATS CPU 408 prior to them being transmitted to the market venue.

Figure 5B:
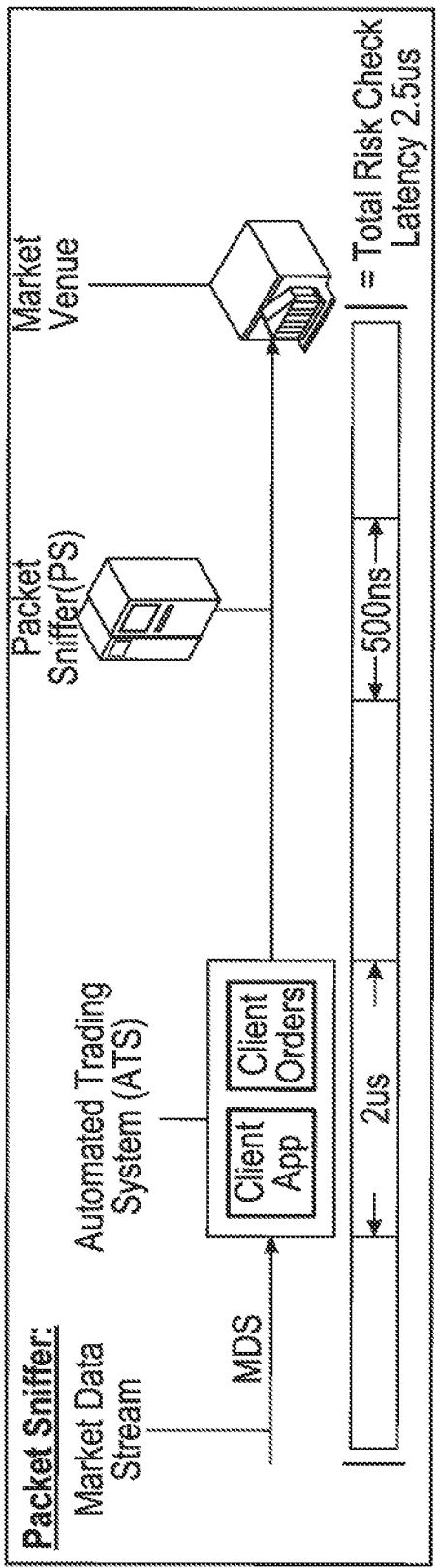
Figure 5B:
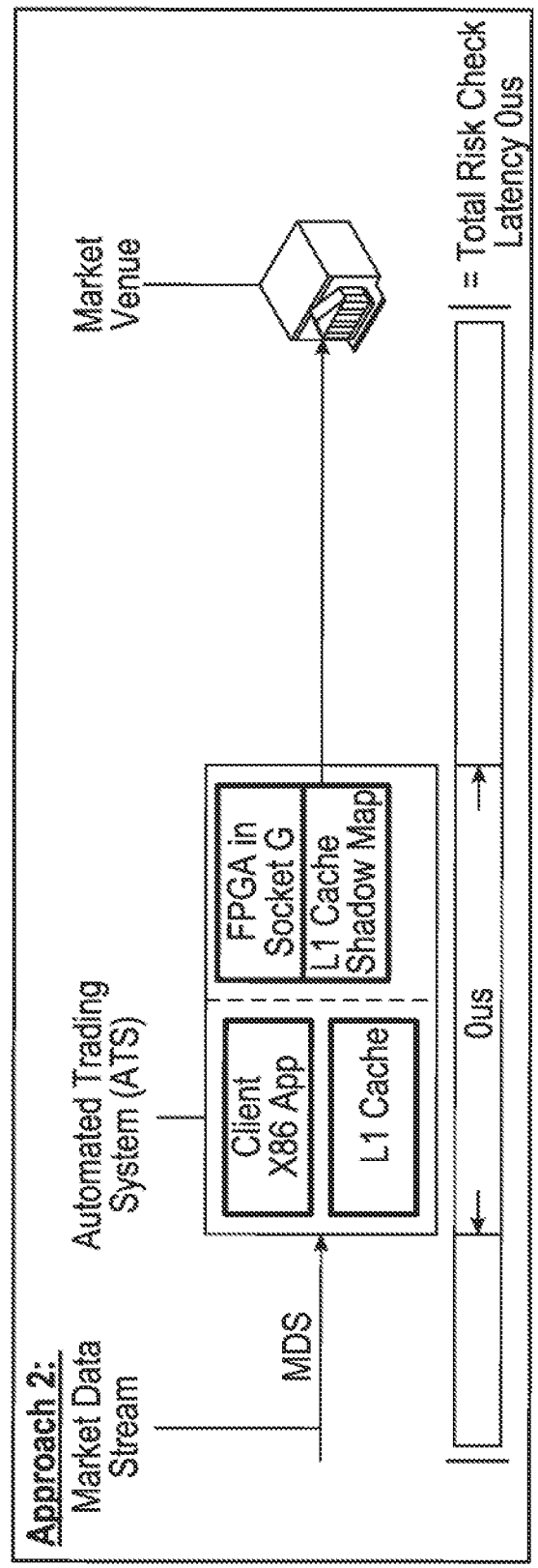

FIG. 5A details the comparable latencies involved in Approach 1, and FIG. 5B details the latencies involved in Approach 2 when measured against the fastest packet sniffer systems currently available.

In Approach 1, it is estimated that this configuration would provide significant latency improvements over existing packet sniffer risk systems. The latency improvements would occur, at least in part, as a result of enabling the FPGA to risk check the orders from the X86 DRAM shadow map in approximately 1.5 us. As previously stated, it is estimated that this would be at least 40% faster than the very quickest PS configuration currently in operation. In Approach 2 however, the operational latency of the ATS would not be affected at all because the FPGA would be able to read the L1 shadow map (delivered via the QPI) and provide pre-trade risk interruptions back to the X86 ATS processor before the ATS would ordinarily submit an order to market. Consequently, the additional operational latency added by the FPGA risk system to the ATS standard functions would be zero. This figure would also be achieved despite the FPGA executing the 40+ pre-trade risk calculations as currently required by the market regulators.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The systems and methods disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the systems and methods disclosed herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the systems and methods disclosed herein may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

Any software, circuitry and/or components described herein may also include and/or utilize one or more types of non-transitory or transitory computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "'comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" issued in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A system comprising:
a first memory;
a shadow map of the first memory;

an automated trading system (ATS) processor in communication with the first memory and the shadow map, the ATS processor configured to
    receive market data information,
    write market order information to the first memory based on the market data information,
    update the shadow map based on the market order information written to the first memory, and
    prepare a market order for transmission to a market venue based on the market order information; and
a trade risk processor in communication with the ATS processor, the trade risk processor configured to
    obtain the market order information from the shadow map, and
    perform a trade risk assessment based on the market order information obtained from the shadow map, wherein
        performance of the trade risk assessment and preparation of the market order are simultaneous.

2. The system of claim 1, wherein the trade risk processor is in communication with the ATS processor via a PCIe connection.

3. The system of claim 2, wherein the first memory comprises a dynamic random access memory.

4. The system of claim 3, wherein the ATS processor is further configured to write the market order information to a predictable location on the dynamic random access memory.

5. The system of claim 1, wherein the trade risk processor is in communication with the ATS processor via an Intel Socket G connection.

6. The system of claim 5, wherein the first memory comprises a cache memory.

7. The system of claim 6, wherein the ATS processor is further configured to write the market order information to a predictable location on the cache memory.

8. The system of claim 7, wherein the ATS processor is further configured to copy the market order information from the cache memory to the shadow map via a Quick Path Interconnect.

9. The system of claim 1, wherein the trade risk processor is further configured to:
    determine whether the market order information satisfies one or more risk criteria, and
    if it is determined that the market order information does not satisfy the risk criteria, transmit a cancel order command to the ATS processor.

10. The system of claim 9, wherein the cancel order command is transmitted to the ATS processor before the ATS processor completes preparing the market order for transmission to a market venue.

11. The system of claim 9, wherein the cancel order command is transmitted via a system interrupt.

12. The system of claim 11, wherein the system interrupt is transmitted to the ATS processor via a Northbridge associated with the ATS processor.

13. A system comprising:
a first cache memory;
a shadow map of the first cache memory;
an automated trading system (ATS) processor in communication with the first cache memory and the shadow map, the ATS processor configured to
    receive market data information,
    write market order information to the first cache memory based on the market data information,
    update the shadow map based on the market order information written to the first cache memory, and
    prepare a market order for transmission to a market venue based on the market order information; and
a trade risk processor in communication with the ATS processor, the trade risk processor configured to
    obtain the market order information from the shadow map, and
    perform a trade risk assessment based on the market order information obtained from the shadow map, wherein
        performance of the trade risk assessment and preparation of the market order are simultaneous.

14. The system of claim 13, wherein the trade risk processor is in communication with the ATS processor via an Intel Socket G connection.

15. The system of claim 14, wherein the ATS processor is further configured to copy the market order information from the first cache memory to the shadow map.

16. The system of claim 15, wherein the market order information is copied from the first cache memory to the shadow map via a Quick Path Interconnect.

17. A computer-implemented method comprising:
    receiving, by a computing system, market data information;
    storing, by the computing system, market order information in a first memory based on the market data information;
    preparing, by the computing system, a market order for transmission to a market venue based on the market order information;
    updating, by the computing system, a shadow map based on the storing the market order information in the first memory; and
    performing, by the computing system, a trade risk assessment based on the updated shadow map, wherein
        the preparing the market order and the performing the trade risk assessment are simultaneous.

18. The computer-implemented method of claim 17 further comprising:
    determining that the market order information does not satisfy trade risk criteria, and
    transmitting a cancel order command to an automated trading system (ATS) processor of the computing system.

19. The computer-implemented method of claim 18, wherein the cancel order command is transmitted to the ATS processor before the preparing the market order for transmission to a market venue has completed.

20. The computer-implemented method of claim 18, wherein the cancel order command is transmitted via a system interrupt.

* * * * *